United States Patent [19]

Clark et al.

[11] Patent Number: 4,958,431

[45] Date of Patent: Sep. 25, 1990

[54] MORE CREEP RESISTANT TURBINE ROTOR, AND PROCEDURES FOR REPAIR WELDING OF LOW ALLOY FERROUS TURBINE COMPONENTS

[75] Inventors: Robert E. Clark, Orlando, Fla.; Dennis R. Amos, Rock Hill, S.C.

[73] Assignee: Westinghouse Electric Corp., Pittsburgh, Pa.

[21] Appl. No.: 325,759

[22] Filed: Mar. 20, 1989

Related U.S. Application Data

[62] Division of Ser. No. 168,097, Mar. 14, 1988, Pat. No. 4,897,519.

[51] Int. Cl.⁵ ............................................. B22D 6/00
[52] U.S. Cl. .............................. 29/889.1; 29/889.71; 29/402.09; 29/402.18; 29/402.19
[58] Field of Search ................ 219/76.1, 76.14, 76.15, 219/76.16, 77; 228/119; 29/402.01, 402.09, 402.11, 402.13, 402.16, 402.18, 402.19, 23.5, 156.8 R, 156.8 CF, 156.8 B, 156.8 P, 527.2; 416/229 R, 229 A

[56] References Cited

U.S. PATENT DOCUMENTS

| | | | |
|---|---|---|---|
| 3,650,635 | 3/1972 | Wachtell et al. | 29/402.13 X |
| 3,797,085 | 3/1974 | Aartman | 29/402.13 X |
| 4,213,025 | 7/1980 | Kuhnen | 219/73.2 |
| 4,219,717 | 8/1980 | Kuhnen | 219/61 |
| 4,633,554 | 1/1987 | Clark et al. | 29/156.4 R |
| 4,657,171 | 4/1987 | Robuns | 29/402.09 X |
| 4,726,101 | 2/1988 | Draghi et al. | 29/402.13 X |

FOREIGN PATENT DOCUMENTS

| | | | |
|---|---|---|---|
| 0234848 | 9/1987 | European Pat. Off. | 219/76.14 |
| 0163091 | 12/1981 | Japan | 228/119 |

OTHER PUBLICATIONS

Clark, R. E., et al, "Experiences with Weld Repair of Low Pressure Steam Turbine Rotors", 47th American Power Conference, Chicago, Illinois, Printed by Westinghouse Electric Corporation, Power Generation, Orlando, Florida.

Clark, R. E., et al, "Development of the Techniques for High Pressure Rotor Weld Repair", Westinghouse and Mitsubishi Tech. Seminar, Takasago, Japan, Jul. 1987, Propietary Document of Westinghouse.

Primary Examiner—Mark Rosenbaum
Assistant Examiner—Frances Chin

[57] ABSTRACT

A more creep resistant turbine rotor and novel methods for repairing worn surfaces of Cr-Mo-V steam turbine components are disclosed. These methods include specified alloy compositions and welding procedures that minimize weld stresses and cracking. These alloys exhibit improved creep and fatigue properties and are preferably deposited using a gas tungsten arc welding procedure. Bead sequencing, cooling side plates and the use of run-off tabs are also disclosed for minimizing welding defects in turbine rotors and discs.

5 Claims, 2 Drawing Sheets

MORE CREEP RESISTANT TURBINE ROTOR, AND PROCEDURES FOR REPAIR WELDING OF LOW ALLOY FERROUS TURBINE COMPONENTS

This is a division of application Ser. No. 168,097, filed Mar. 14, 1988, now U.S. Pat. No. 4,897,519.

CROSS REFERENCE TO RELATED APPLICATIONS

This application is related to co-pending application Ser. No. 190,324, filed May 5, 1988, in the names of R. E. Clark and D. R. Amos, having attorney docket numbers (54,134; WE-62), entitled "Repair Welding of High Pressure Cr-Mo-V Rotor Blade Groove Fastenings by Weld-Build Up", which is assigned to the assignee of this application and which is hereby incorporated by reference.

This application is also related to co-pending application Ser. No. 092,851, filed Aug. 24, 1987, in the names of R. T. Ward and J. M. Butler, having attorney docket number (52,926), entitled "Repair of High-Pressure Turbine Rotors By Ring Welding", which is assigned to the assignee of this application and which is herein incorporated by reference.

This application is also related to application, Ser. No. 763,744, filed Aug. 8, 1985, in the names of R. E. Clark and D. R. Amos, having attorney docket number (52,618) entitled "Method for Repairing A Steam Turbine Or Generator Rotor", now U.S. Pat. No. 4,633,544, issued Jan. 6, 1987, which is assigned to the assignee of this application and which is herein incorporated by reference.

This application is also related to co-pending application Ser. No. 727,175, filed Apr. 25, 1985, in the names of R. E. Clark, D. R. Amos, and L. M. Friedman, having attorney docket number (52,192) entitled "High Strength, High Toughness Welding for Steam Turbine Rotor Repair", which is assigned to the assignee of this application and which is hereby incorporated by reference.

FIELD OF THE INVENTION

This invention relates to repair procedures for worn and damaged surfaces of turbine components, and in particular, to welding techniques for building up these worn surfaces with sound metal deposits.

BACKGROUND OF THE INVENTION

Steam turbine components made of Cr-Mo-V alloys, such as rotors and discs, provide optimum high-temperature fatigue and creep properties, but are considered difficult to weld. However, since the down time associated with replacement of these often worn, eroded, or cracked components can cost electric utilities hundreds of thousands of dollars per day, many procedures have been attempted to repair them.

One such repair procedure consists of welding an individual piece of forged steel to a worn rotor or disc. However, when this type of repair is made on a single rotor blade groove fastening, herein referred to as a "steeple", welder accessibility is very limited. Accordingly, a weld repair conducted with very limited accessibility can result in unacceptable, non-destructive examination quality due to the formation of porosity cracks and slag inclusions.

It is also known to make rotor repairs by submerged arc welding after a low volume welded seam is made between a turbine component and a forged replacement section. See Kuhnen, U.S. Pat. Nos. 4,213,025 and 4,219,717, which are herein incorporated by reference. In such a procedure, a ring forging is welded to a worn disc or rotor or a completely new rotor forging is welded to replace the entire end of the rotor. See Clark et al. U.S. Pat. No. 4,633,554, disclosing a narrow gap weld root pass followed by a gas metal arc build-up for this purpose.

The lower tensile and fatigue properties obtained by employing this process, however, are generally insufficient for use in high stress rotor steeple areas.

Submerged arc welding alone has also been used for build-up repairs of rotor areas involving a wide or deep groove, where a cracked defect is not oriented longitudinally along the radius of the rotor. The main advantage of building up with submerged arc welding is that this procedure has a very high deposition rate, typically about 15 pounds of weld metal per hour. The higher deposition rate is important since many of the service rotor weld repairs are made during turbine outages, thus, time is extremely important. However, this process requires a pre-heat, produces a relatively large grain size with inferior metallurgical properties. Typically, these submerged arc weldments on low pressure rotors have a yield strength of about 85 to 100 ksi (586 to 689 MPa) and a room temperature Charpy toughness of about 100 to 120 ft-lbs (136 to 163 J). It is also understood that submerged arc weldments are often rejected due to poor ultrasonic quality, which often reveals slag inclusions and porosity in the weld metal. Moreover, serious creep-rupture and notch-sensitivity problems have been encountered for high pressure Cr-MO-V rotor welds manufactured from submerged arc weldments. Thus, the submerged arc process is generally unacceptable for use for weld repairs of Cr-Mo-V rotor steeples having small, high-stress concentration radii.

Gas metal arc procedures have also been employed for repairing rotors and discs. This welding procedure deposits about 8 lbs of weld metal per hour, typically having slightly better properties than weldments produced by the submerged arc process. Gas metal arc weldments of alloy steel turbine components generally have a yield strength of about 85 to 100 ksi (586 to 689 MPa), and a room temperature Charpy toughness of about 110 to 130 ft-lbs (150 to 177 J). For Cr-Mo-V rotor repair welding, the gas metal arc welding process, however, is often associated with arc-blow (magnetic) process limitations when used with Cr-Mo-V alloys.

Recently, emphasis has been placed on the use of gas tungsten arc welding processes (GTAW) for making repairs on Ni-Mo-V and Ni-Cr-Mo-V low pressure rotor components. See R. E. Clark, et al. "Experiences with Weld Repair of Low Pressure Steam Turbine Rotors", 47th American Power Conference, Apr. 22-24, 1985, Chicago, Ill., printed by Westinghouse Electric Corporation, Power Generation, Orlando, Fla., herein incorporated by reference. Gas tungsten arc welding has been employed for repairing individual rotor attachment grooves, cosmetic, or shallow groove repairs to correct minor surface defects. It has also been used to allow multiple build-ups of plate attachment groove locations, i.e., for a 360° application, and cladding to restore worn-away material. Gas tungsten arc welding offers relatively high ultrasonic quality, requires no pre-heat, and produces weldments having tensile and impact properties which exceed rotor material specification requirements. Low alloy steel weldments produced by this process nominally have a yield strength of about 90 to 115 ksi (621 to 793 MPa), and a room temperature Charpy toughness of about 160 to 210 ft-lbs (218 to 286 J). In addition, this welding procedure produces the finest microstructural grain size of any of the above-mentioned processes.

The selection of a weld method depends on factors such as distortion, non-destructive testing acceptance limits, and mechanical property response to the post-weld heat treatment. Each area of a turbine rotor is unique, and experiences a different service duty. The absence of weld and heat affected zone cracking as well as the minimization of defects, can only be accomplished by carefully controlling a number of welding variables. For the gas tungsten arc welding process, some of these variables include amperage, alloy selection, joint geometries and travel rate. The parameters selected should be accommodating to automatic welding processes to obtain a uniform quality which is reproducible from weld to weld. These parameters must also produce superior welding characteristics such as freedom from porosity, CraCking, and slag entrapment, while being accommodating to all possible repairs on rotors and discs. Finally, the alloy and welding parameters selected must produce a weld comparable to the properties of the base metal.

Accordingly, a need exists for a welding procedure that maximizes the metallurgical properties of the repaired area of turbine components. There is also a need for a welding procedure that minimizes the heat affected zone and eliminates weld-related cracking.

SUMMARY OF THE INVENTION

Novel methods for repairing worn surfaces of steam turbines are disclosed. The methods include alloy compositions and welding procedures that minimize weld stresses and cracking. The alloys selected, by this invention, have stress rupture properties substantially equivalent to the ferrous Cr-Mo-V base metal of high-pressure, high temperature rotors, discs and blades commonly found in steam turbines. The invention is particularly valuable for repairing high pressure turbine rotors which undergo extreme temperature and mechanical stresses. The methods employed also disclose bead sequencing and cooling side plates for minimizing heat input into the base metal. Run off tabs are also taught for minimizing weld defects created by starting and stopping the arc.

Accordingly, optimum techniques are disclosed which substantially reduce the possibility of stress relief cracking and produce a fine grain size in the base metal which increases the toughness and fatigue strength of the repaired turbine components.

It is, therefore, an object of this invention to provide repair welding procedures compatible with new Cr-Mo-V rotors and discs as well as those currently in service.

It is another object of this invention to provide welding procedures and alloys which provide improved notch sensitivity characteristics and increased creep ductility to repaired turbine components.

It is still another object of this invention to provide a repaired turbine component which is relatively free of weld porosity, lack of fusion, and cracking resulting from the welding process.

It is still another object of this invention to provide repaired turbine components having acceptable non-destructive examination results.

With these and other objects in view, which will become apparent to one skilled in the art as the description proceeds, this invention resides in the novel construction, combination, arrangement of parts and methods substantially as hereinafter described and more particularly defined by the attached claims.

BRIEF DESCRIPTION OF THE DRAWINGS

The accompanying drawings illustrate a complete embodiment of the invention according to the best mode so far known for the practical application of the principles thereof, and in which.

DETAILED DESCRIPTION OF THE INVENTION

Figure 1:
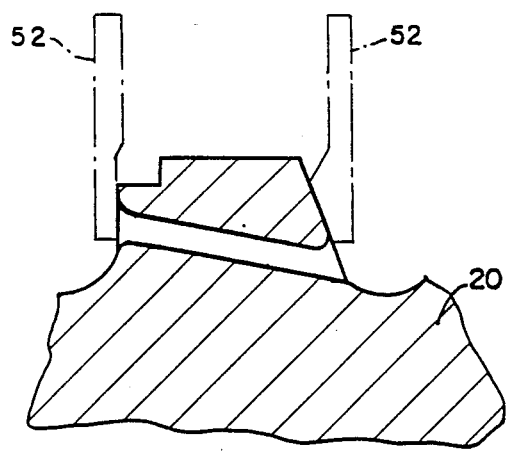
FIG. 1: is a cross-sectional view of a control stage rotor wherein the old steeples have been machined off.

The novel methods of repairing worn surfaces of ferrous steam turbine components containing Cr, Mo and V of this invention includes providing a steam turbine. Component 20, 40, or 50 having a worn surface thereon, and depositing a ferrous alloy on the worn surface.

The ferrous alloys used in this invention to repair the Cr-Mo-V components of steam turbines are selected to include one or more of the following elements: Cr, Mo, Si, C, Mn, V, Nb, N and Fe.

In a more preferred embodiment, the ferrous alloy applied to the worn component is selected to comprise about 7.0 to 11.0 weight percent Cr and about 0.1 to 3.0 weight percent Mo. One specified preferred ferrous alloy composition range consists essentially of about 0.04 to 0.22 weight percent C, 0.15 to 1.0 weight percent Mn, 0.15 to 1.0 weight percent Si, 0.0 to 0.02 weight percent P, 0.0 to 0.016 weight percent S, 0.0 to 0.8 weight percent Ni, 4.00 to 19.0 weight percent Cr, 0.43 to 2.1 weight percent Mo, 0.09 to 0.5 weight percent V, 0.03 to 0.20 weight percent Nb, 0.0 to 0.08 weight percent Al, 0.0 to 0.20 weight percent Cu, 0.005 to 0.06 weight percent N and the balance being Fe. However, the most preferred a ferrous alloy consists essentially of 0.08 to 0.11 weight percent C, 0.30 to 0.50 weight percent Mn, 0.30 to 0.50 weight percent Si, 0.00 to 0.10 weight percent P, 0.00 to 0.008 weight percent S, 0.00 to 0.40 weight percent Ni, 8.00 to 9.50 weight percent Cr, 0.85 to 1.05 weight percent Mo, 0.18 to 0.25 weight percent V, 0.06 to 0.10 weight percent Nb, 0.00 to 0.04 weight percent Al, 0.00 to 0.10 weight percent Cu, 0.01 to 0.03 weight percent N and the balance being Fe.

In further accordance to these novel methods, the depositing step can consist of welding the ferrous alloy to the worn surface of the turbine component 20, 40, or 50. This welding step preferably is accomplished by any one of gas tungsten arc welding, plasma-arc welding, electron beam welding, laser-beam welding and gas metal arc welding. It is expected that other welding procedures may be used to apply the novel alloys of this invention, however, it is important that the welding procedure employed minimize the heat-affected-zone in the base metal so as to avoid unnecessary defects.

The most preferred procedure employed thus far comprises gas tungsten arc welding the preferred ferrous alloys to a machined or ground turbine component 20, 40, or 50 to form a .multi-pass build-up 12, 42 or 54. In accordance with the preferred gas tungsten arc welding procedures of this invention, the steam turbine component 20, 40 or 50 is preheated to at least about 177° C. prior to the welding step. Side plates can be employed for "360°" welding applications on discs and rotors, but are not required. As used herein, a "360°" repair refers to a procedure wherein weld metal is deposited continuously about the circumference of a turbine component, such as a rotor or disc, until a sufficient height is reached whereupon the individual steeples of the rotor are machined, or the disc is machined down to service tolerances. The side plates 52 preferably are manufactured from Cr-Mo-V rotor steel or copper, and can be water cooled to further reduce welding side effects.

Figure 5:
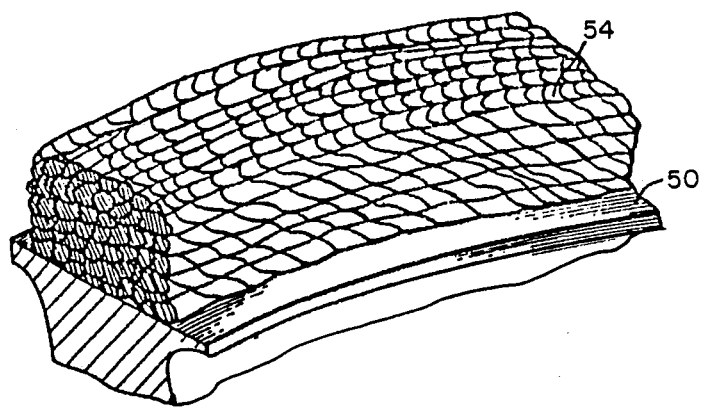
FIG. 5: is a partial perspective, illustrating a 360° repair of a rotor where the steeples have been machined off and the resulting 360° weld build-up is shown.

For a 360° steeple weld build up as described in FIG. 5, a preferred procedure for high pressure rotor repairs, any steeples 44 present on the rotor are machined off to form a solid ring of material. Next, a 360° weld build-up 54 is made. This build up may be made using water cooled copper side plates which can be disposed along an edge of the worn surface. The welding operation can, therefore, deposit the preferred ferrous alloys of this invention on the machined surface as well as against the water cooled side plates.

When a single steeple repair is made on a rotor component, the worn steeple is preferably removed entirely from the rest of the rotor. Next, a first run-off tab is disposed along at least a first longitudinal edge of the rotor for at least providing a starting surface for the welding step. A second run off tab can be disposed on a second longitudinal edge of the rotor transversely opposed from the first longitudinal edge, for at least providing a surface for stopping the welding step. Since the attachment sites for the run-off tabs 46 can sometimes be the point of defects, a cladding procedure is used to join these run-off tabs 46 to the rotor. Preferably this cladding comprises a buttering layer, and more preferably this buttering layer comprises chrome and is disposed in at least two overlapping weldments.

During the preferred (GTAW) welding repair of a single steeple repair, a first bead is welded transversely across the rotor on the machined or otherwise prepared surface. Next, a second bead is welded transversely across the rotor on the prepared surface, and preferably spaced apart from the first bead. The third and fourth weld beads are similarly disposed and spaced apart, if room is available. Using this intermittent welding procedure permits the immediate area of base metal underneath the weld to slowly cool prior to the next adjoining welding application. Accordingly, the brittleness associated with a weld-created, heat affected zone is minimized.

The turbine rotor 20 of FIG. 1 preferably is selected from a turbine already in service, although it is expected that new rotors without serrations can be used as the initial turbine component for the following welding procedures.

Generally the steam turbine rotors, and discs of this invention are manufactured from low alloy steel, commonly containing less than 6% alloying elements, such as the preferred Cr-Mo-V alloy, A470, class 8, and its modified versions.

When a used turbine component, such as rotor 20, 40 and 50, is employed, the highly stressed, individual steeples 44 are preferably mechanically removed. As used herein, "mechanically removing" refers to any of the known procedures for removing metal, including but not limited to, grinding, machining, electric arc gouging, and other methods known to those in the metallurgy arts. As in the case of FIG. 4, the entire worn steeple should be removed since it is important to reduce the possibility of creating any weak heat-affected zones in the high stress areas of these components by subsequent welding operations.

Figure 2:
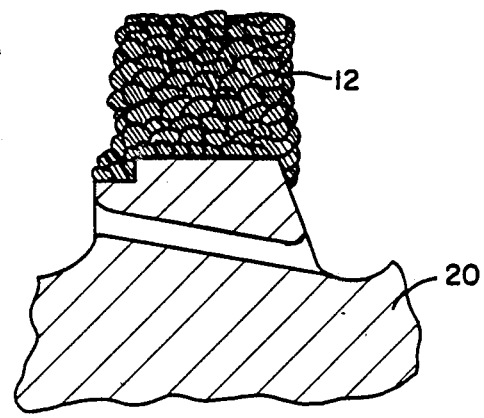
FIG. 2: is the cross-sectional view of the control stage rotor of FIG. 1, illustrating a weld build up disposed on the machined surface.
Figure 3:
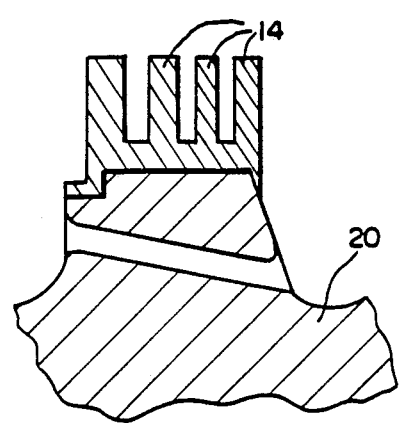
FIG. 3: is the partial, cross-sectional view of the control stage rotor of FIG. 2, illustrating machined and repaired steeples.
Figure 4:
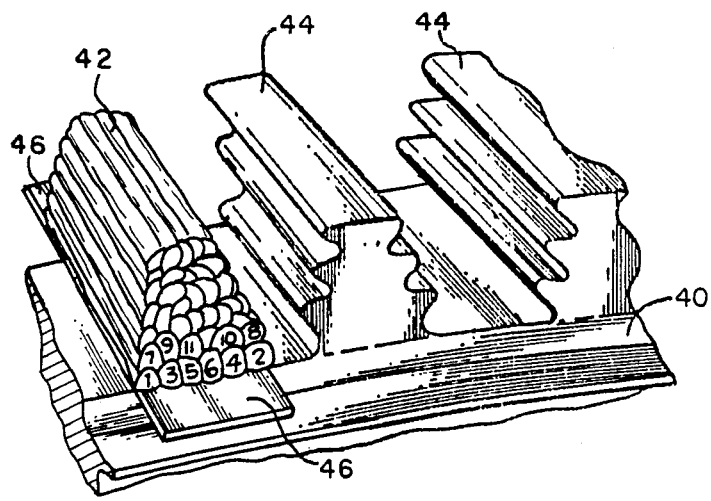
FIG. 4: is a partial prospective of a single steeple repair technique, illustrating the use of run-off tabs plates and bead-sequencing.

As generally described in FIGS. 2, 4 and 5, the preferred ferrous alloy compositions of this invention can be deposited by welding them to the worn surface of the turbine component. This welding step can be accomplished by any one of the known welding techniques, but preferably any one of gas tungsten arc welding, plasma-arc welding, electron beam welding, laser-beam welding, and gas metal arc welding. A preferred preheat of at least about 100° C. to about 300° C., more preferably about 177° C. to about 204° C., can be employed for reducing stresses in the turbine component 20, 40 and 50 prior to the welding step.

In preparation for the preferred gas tungsten arc welding procedure of this invention, the surfaces to be welded are preferably conditioned to bright metal. More preferably, the base metal surfaces are cleaned for a distance of about 2 inches from the weld area with denatured alcohol, acetone, methyl chloroform, or solvent cleaner. It is also further noted that if methyl chloroform is applied, it should be followed with an alcohol, acetone or solvent wash. It is further advised that the base metal surface to be welded be inspected using non-destructive testing procedures, and that at least one sixteenth inch of additional metal be removed beyond the deepest crack found or suspected fatigued area.

In accordance with the preferred GTAW procedure of this invention, the following welding parameters have been deemed useful:

TABLE II

| Parameter | Layer 1,3,4 | Layer 2 | Remainder of Weld |
|---|---|---|---|
| Nature of Current | Pulsed 60% | Pulse 60% | Straight (no pulse) |
| Amperage-DCSP | 85–120 | 100–150 | 280 |
| Voltage | 8.5–9.0 | 9.0–10 | 11–13 |
| Surface Speed (Linear), Inch | 4.0 | 3.0 | 4.5–8.0 |
| Frequency of Pulse | 3 cycles/sec | 3 cycles/sec | None |
| Type of Travel | OSC × .300 | OSC × .300 | Straight |
| Osc. Amplitude | .22 | .22 | 0 |
| Wire Feed Speed, inches per min. | 5–25 | 5–20 | 50 |
| Tungsten Size, 2% Thorium, inch dia | 1/8 or 3/32 | 1/8 or 3/32 | 1/8 |
| Tungsten Stickout, inch | 3/8 — 3/4 | 3/8 — 3/4 | 3/8 — 3/4 |
| Wire Size, inch dia | .045 | .045 | .045 |
| Primary Shield, Argon-Helium | 50% + 50% | 50% + 50% | 50% + 50% |
| Trail Shield, Argon | 100% | 100% | 100% |
| Bead Overlap | 50% | 50% | 50% |

As described in FIG. 4, the bead sequence for the welding application should provide spaced bead sequencing, i.e., depositing a first bead 1 transversely across the preferred rotor 40 on the machined surface and then welding a second bead 2 on the prepared surface, transversely across the rotor and spaced apart from the first bead. By working the weld metal from the outside to the inside of the welded areas for beads 1–10 etc., less of a heat affected zone (HAZ) is created by the welding procedure. Peening is not advised, and the welding is preferably accomplished by an automated GTAW machine in the flat, +/− 15°, position. Weld stops for this machine shall be made using current tapering to a value of 15 amps or less before breaking the arc. In addition, run off tabs 46, such those shown in FIG. 4, should be used for starting and stopping the weldment, since these locations may develop metallurgical defects. It is also advisable that the base metal be demagnetized prior to welding to minimize arc blow.

During the welding procedure, the interpass temperature of the base metal preferably should be below 300° C., preferably below 250° C., and most preferably below 204° C. Immediately after welding, the welded turbine component should be maintained at a temperature of about 149° C. to about 260° C., preferably about 176° C. to about 204° C. After this post-heat maintenance schedule, the welded turbine component can be given a post-weld heat treatment above 500° C., preferably above 600° C., and more preferably about 663° C. The post-weld heat treatment temperature should be selected to minimize weld stresses, provide sufficient "tempering back" of the weld and heat affected zone hardness, and if necessary, prevent "over tempering" of the unaffected base metal, to obtain the required weld strength. The preferred rotor repair techniques of this invention generally include a post-weld heat treatment locally at the repair weld area. This local stress relief consists of heating the entire repair area and also axially along the rotor to meet any preselected axial and radial temperature gradients.

Following the post-weld heat treatment of the welded area, the turbine components 20, 40 and 50 repaired by the above-mentioned procedures are blast cleaned and provided with a nondestructive examination, for example, magnetic particle, dye penetrant or ultrasonic testing. In addition, mechanical testing is conducted by determining the hardness of the weld deposit and by tensile testing metal coupons that were fabricated during the same welding operation. The turbine component is then ready for final dimensional checks and a finishing machining operation, i.e. to produce serrations 14.

From the foregoing, it can be realized that this invention provides improved procedures for repairing ferrous steam turbine components. The welding methods, alloys, and heat treatment schedules provide a repaired surface exhibiting improved high temperature properties. Although various embodiments have been illustrated, this was for the purpose of describing, and not limiting the invention. Various modifications, which will become apparent to one skilled in the art, are within the scope of this invention described in the attached claims.

I claim as my invention:

1. In a steam turbine system having a rotor comprising a Cr-Mo-V alloy having less than about 6 wt. % alloying ingredients for securing blades, the improvement comprising:
a plurality of layered weldments, including at least two spaced apart weldments, disposed on said rotor, each of said weldments consisting essentially of a ferrous alloy comprising about 7.0 to 11.0 wt. % Cr and about 0.1 to 3.0 wt. % Mo said weldments forming a build-up on said rotor which can be machined into a blade-retaining device, said rotor being relatively free of cracking resulting from the welding process.

2. The system of claim 1 wherein said deposit consists essentially of about 0.04 to 0.22 weight percent C. 0.15 to 1.0 weight percent Mn, 0.15 to 1.0 weight percent Si, 0.0 to 0.02 weight percent P, 0.0 to 0.016 weight percent S, 0.0 to 0.8 weight percent Ni, 4.00 to 19.0 weight percent Cr. 0.43 to 2.1 weight percent Mo, 0.09 to 0.5 weight percent V, 0.03 to 0.20 weight percent Nb, 0.0 to 0.08 weight percent Al, 0.0 to 0.20 weight percent Cu, 0.005 to 0.06 weight percent N, and the balance being Fe.

3. The system of claim 1 wherein said deposit consists essentially of about 0.08 to 0.11 weight percent C, 0.30 to 0.50 weight percent Mn, 0.30 to 0.50 weight percent Si, 0.00 to 0.10 weight percent P, 0.00 to .008 weight percent S, 0.00 to 0.40 weight percent Ni, 8.00 to 9.50 weight percent Cr, 0.85 to 1.05 weight percent Mo, 0.18 to 0.25 weight percent V, 0.06 to 0.10 weight percent Nb, 0.00 to 0.04 weight percent Al, 0.00 to 0.10 weight percent Cu, 0.01 to 0.03 weight percent N, and the balance being Fe.

4. The steam turbine system of claim 1 wherein said weldments are disposed by one or more of: gas tungsten arc welding, plasma-arc welding, electron beam welding, laser-beam welding, and gas metal arc welding, for minimizing heat input into said rotor.

5. The steam turbine system of claim 1 wherein said rotor is preheated to about 100°–300° C.

* * * * *